(12) United States Patent
Bordawekar et al.

(10) Patent No.: US 11,847,113 B2
(45) Date of Patent: Dec. 19, 2023

(54) METHOD AND SYSTEM FOR SUPPORTING INDUCTIVE REASONING QUERIES OVER MULTI-MODAL DATA FROM RELATIONAL DATABASES

(71) Applicant: International Business Machines Corporation, Armonk, NY (US)

(72) Inventors: Rajesh Bordawekar, Yorktown Heights, NY (US); Bortik Bandyopadhyay, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 17/352,877

(22) Filed: Jun. 21, 2021

(65) Prior Publication Data

US 2021/0311937 A1 Oct. 7, 2021

Related U.S. Application Data

(63) Continuation of application No. 16/179,293, filed on Nov. 2, 2018, now Pat. No. 11,074,253.

(51) Int. Cl.
*G06F 16/24* (2019.01)
*G06F 16/242* (2019.01)
*G06N 5/04* (2023.01)
*G06F 16/28* (2019.01)

(52) U.S. Cl.
CPC ........ *G06F 16/2433* (2019.01); *G06F 16/285* (2019.01); *G06N 5/04* (2013.01)

(58) Field of Classification Search
CPC .......................... G06F 16/2433; G06F 16/285
See application file for complete search history.

(56) References Cited

U.S. PATENT DOCUMENTS

| | | | |
|---|---|---|---|
| 2007/0185900 A1 | 8/2007 | Gadamsetty et al. | |
| 2016/0203422 A1* | 7/2016 | Demarchi | G06F 16/29 705/6 |
| 2017/0308613 A1 | 10/2017 | Zhu et al. | |
| 2018/0011927 A1 | 1/2018 | Lee et al. | |
| 2018/0068371 A1* | 3/2018 | Krishnamurthy | G06N 3/0427 |
| 2018/0267977 A1 | 9/2018 | Bandyopadhyay et al. | |
| 2019/0026389 A1 | 1/2019 | Beller et al. | |

OTHER PUBLICATIONS

Mel, et al. "The NIST Definition of Cloud Computing". Recommendations of the National Institute of Standards and Technology. Nov. 16, 2015.

(Continued)

*Primary Examiner* — Baoquoc N To
(74) *Attorney, Agent, or Firm* — Peter Edwards; McGinn I.P. Law Group, PLLC

(57) ABSTRACT

A system, apparatus, and a method for training with multi-modal data in a relational database, including generating a first database including a multi-view of the multi-modal data, retrieving a second set of data from an external source via a network, and training a first model according the first database and the second set of data. The first model outputs relationships of the first database with the multi-view and the second set of data.

20 Claims, 13 Drawing Sheets

(56) References Cited

OTHER PUBLICATIONS

D. D. M. Ranasinghe and A. S. Karunananda, "Qualitative Reasoning Engine for Visual Scene Understanding in Cognitive Vision Systems," 2006 International Conference on Information and Automation, Shandong, 2006, pp. 81-85.

S. Garg, J. E. Nam, I. V. Ramakrishnan and K. Mueller, "Model-driven Visual Analytics," 2008 IEEE Symposium on Visual Analytics Science and Technology, Columbus, OH, 2008, pp. 19-26.

Luc De Raedt, "A perspective on inductive databases," SIGKDD Explor.Newsl. 4, 2 (Dec. 2002), pp. 69-77.

United States Notice of Allowance dated Mar. 19, 2021, in U.S. Appl. No. 16/179,293.

United States Office Action dated Nov. 24, 2020, in U.S. Appl. No. 16/179,293.

United States Office Action dated May 13, 2020, in U.S. Appl. No. 16/179,293.

\* cited by examiner

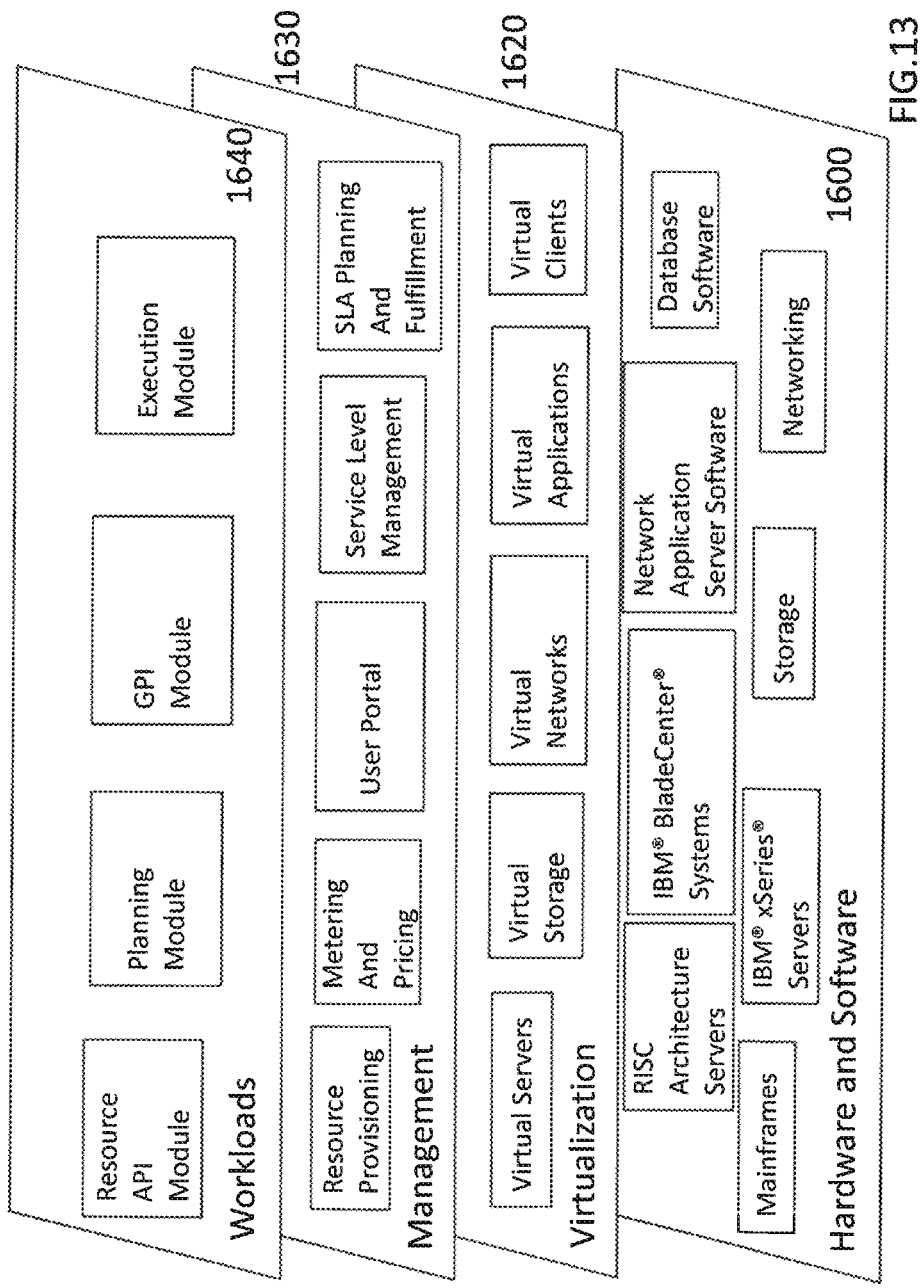

METHOD AND SYSTEM FOR SUPPORTING INDUCTIVE REASONING QUERIES OVER MULTI-MODAL DATA FROM RELATIONAL DATABASES

CROSS-REFERENCE TO RELATED APPLICATIONS

The present application is a Continuation Application of U.S. patent application Ser. No. 16/179,293, filed on Nov. 2, 2018, the entire contents of which are hereby incorporated by reference.

BACKGROUND OF THE INVENTION

Field of the Invention

The disclosed invention relates generally to an embodiment of a method and system for supporting queries, and more particularly, but not by way of limitation, relating to a method and system for supporting inductive reasoning queries over multi-modal data from relational databases.

Description of the Background Art

In today's world of the Internet, modern electronics, business, finance, healthcare, and other venues, there are massive amounts of data which are difficult to manage and use. With the rise of Artificial Intelligence, there is a tool to help manage and use the received information, but practical applications have had problems. There is a problem of using the large amount of information in a cognitive manner especially with multi-modal data.

In broad terms, cognition refers to the process of building knowledge capabilities using innate resources (i.e., intelligence), enriching it with external inputs such as experiences or interactions, and applying the knowledge to solve problems that in turn, feeds back towards knowledge building. While these definitions are more relevant to animate objects, they can be also applicable to scenarios in which inanimate entities simulate cognitive processes.

Therefore, there is a need to use cognitive processes in order to more efficiently manage and use the large amounts of data that are of various types in order to enable artificial intelligence capabilities.

SUMMARY OF INVENTION

In view of the foregoing and other problems, disadvantages, and drawbacks of the aforementioned background art, an exemplary aspect of the disclosed invention provides a method and system for supporting inductive reasoning queries over multi-modal data from relational databases.

One aspect of the present invention is to provide a method of performing queries, including generating text representations of features of various types of data, building a multi-modal word embedding model to capture relationships between the various types of data, and based on the multi-modal word embedding model, performing an inductive reasoning query.

Another aspect of the present invention provides system for performing queries, including a memory storing computer instructions, and a processor configured to execute the computer instructions to generate text representations of features of various types of data, and build a multi-modal word embedding model to capture relationships between the various types of data, and based on the multi-modal word embedding model, perform an inductive reasoning query.

Another example aspect of the disclosed invention is to provide a computer program product comprising a computer readable storage medium having program instructions embodied therewith, the program instructions readable and executable by a computer to cause the computer to perform a method, including generating text representations of features of various types of data, and building a multi-modal word embedding model to capture relationships between the various types of data, and based on the multi-modal word embedding model, performing an inductive reasoning query.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF DRAWINGS

The exemplary aspects of the invention will be better understood from the following detailed description of the exemplary embodiments of the invention with reference to the drawings.

FIG. 13 depicts abstraction model layers according to an embodiment of the present invention.

DETAILED DESCRIPTION OF PREFERRED EMBODIMENTS

Figure 1:
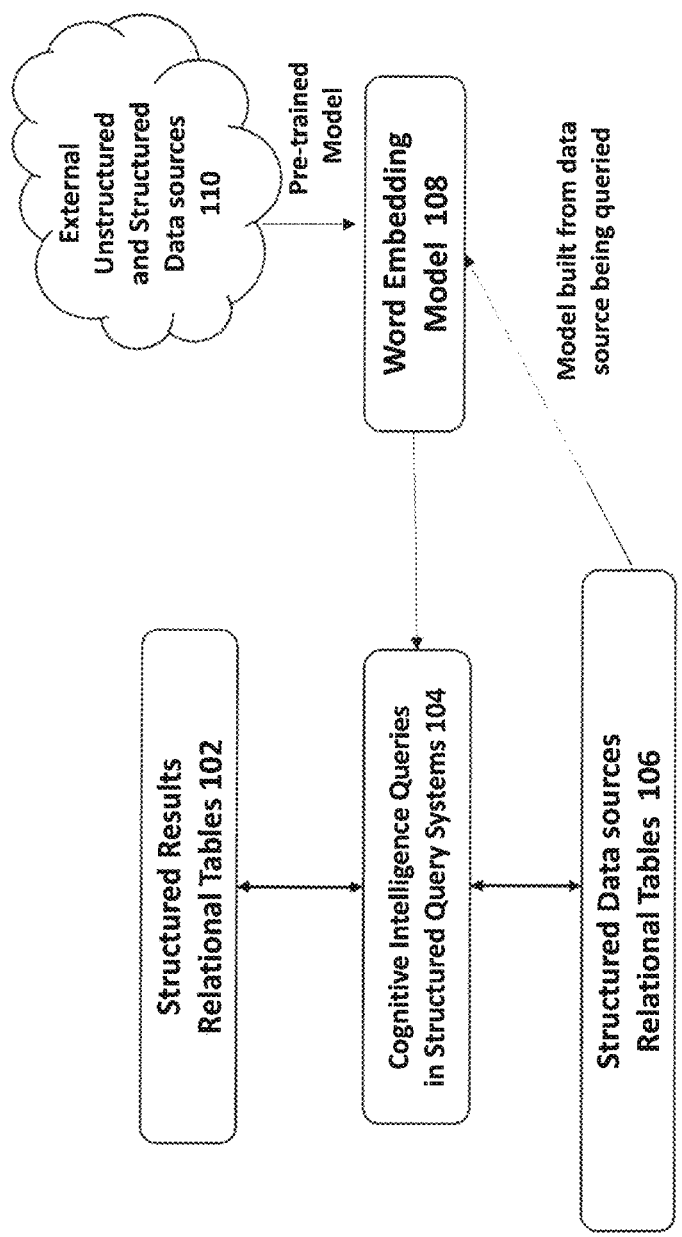
FIG. 1 illustrates the embedding model of an exemplary embodiment.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

There is disclosed Cognitive Databases, an approach for transparently enabling Artificial Intelligence (AI) capabilities in relational databases. A novel aspect is to first view the structured data source as meaningful unstructured text, and then use the text to build an unsupervised neural network model using a Natural Language Processing (NLP) technique called word embedding. This model captures the hidden inter-/intra-column relationships between database tokens of different types. For each database token, the model includes a vector that encodes contextual semantic relationships. The system seamlessly integrates the word embedding model into existing SQL (Structured Query Language) query infrastructure and use it to enable a new class of SQL-based analytics queries called cognitive intelligence (CI) queries. CI queries use the model vectors to enable complex queries such as semantic matching, inductive reasoning queries such as analogies, predictive queries using entities not present in a database, and, more generally, using knowledge from external sources. This system exemplifies using AI functionality to endow relational databases with capabilities that were previously very hard to realize in practice.

In the system, there is a focus on a particular cognitive process of reading comprehension of text via contexts and apply it to relational databases. There is an objective to build a cognitive relational database system that not only extracts latent semantic information, but can also enrich it by using external input (e.g., external knowledge bases, new data being inserted, or types of invoked queries) and use it transparently to enhance its query capabilities.

The following a word embedding overview. There is unsupervised neural network-based NLP approach to capture meanings of words-based neighborhood context. Meaning is captured as collective contributions from words in the neighborhood Word embedding generates semantic representation of words as low-dimensional vectors (200-300 dimensions). Semantic similarity measured using distance metric (e.g., cosine distance) between vectors Some of the features of Cognitive database is as follows. The Cognitive database uses dual view of relational data: tables and meaningful text, with all relational entities mapped to text, without loss of information. The Cognitive database uses word-embedding approach to extract latent information from database tables. Classical Word embedding model is extended to capture constraints of the relational model (e.g., primary keys). The database also enables relational databases to capture and exploit semantic contextual similarities.

FIG. 1 illustrates the embedding model. In the Embedding model External Unstructured and Structured Data sources 110 are inputted as a pre-trained model into the word embedding model 108. Structured data sources relational tables 106 are also inputted into the word embedding model 108. The model 108 is built from data sources being queried. Cognitive intelligence queries in structured query systems 104 receive an output from the word embedding model 108. The Cognitive intelligence queries in structured query systems 104 uses and updates the Structured data sources relational tables 106 and the structured results relational tables 102.

In the database context, vectors may be produced by either learning on text transformed and extracted from the database itself and/or using external text sources. For learning from a database, a natural way of generating vectors is to apply the word embedding method to a string of tokens generated from the database: each row (tuple) would correspond to a sentence and a relation would correspond to a document. Thus, vectors enable a dual view of the data: relational and meaningful text.

The cognitive database features include enabling SQL-based information retrieval based on semantic context, rather than, data values. Unlike analytics databases, the cognitive database does not view database tables as feature and model repositories. The cognitive database has latent features exposed to users via standard SQL based Cognitive Intelligence (CI) queries. Moreover, in cognitive database, users can invoke standard SQL queries using typed relational variables over a semantic model built over untyped strings.

Figure 2:
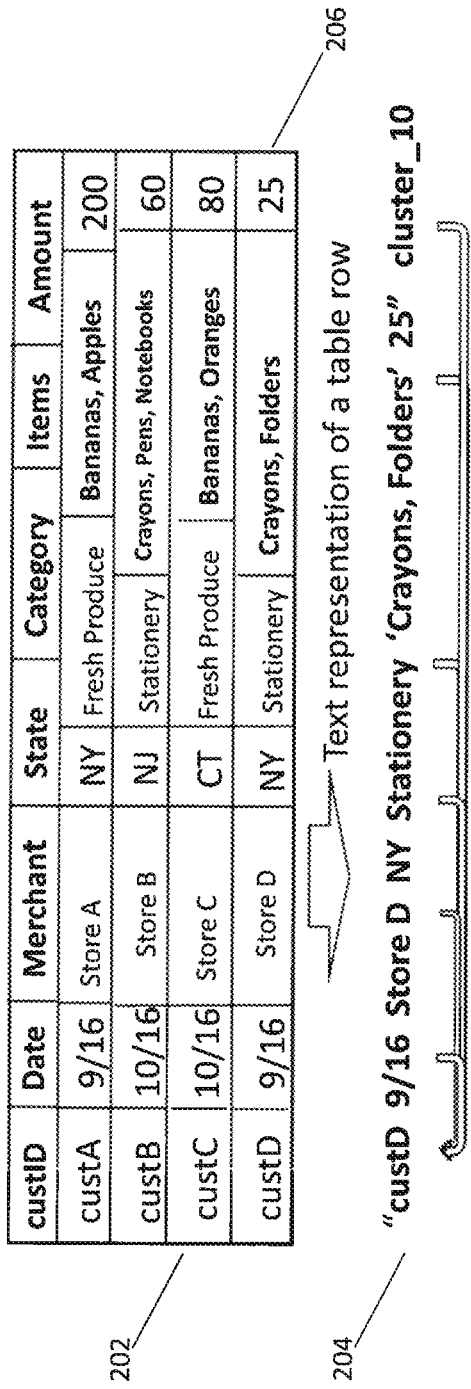
FIG. 2 is an illustration of a customer table of an exemplary embodiment.

To illustrate this process, consider FIG. 2 that present a simple customer sales table. FIG. 2 shows an English sentence like representation of the fourth row 206 in the table 202 (note that the numeric value 25 is represented by the string cluster 10 for the amount of the crayons, folders in the category stationary) Using the scope of the generated sentence as the context, the word embedding approach infers latent semantic information in terms of token associations and co-occurrences and encode it in vectors. Thus, the vectors capture first inter- and intra-column relationships within a row (sentence) and then aggregate these relationships across the relation (document) to compute the collective semantic relationships. At the end of training, each unique token in the database would be associated with a d-dimensional meaning vector, which can be then used to query the source database.

In this example, the relational entity custD (customer D) is semantically similar to custB (customer B) due to many common semantic contributors (e.g., Merchant B, Stationery, and Crayons). Equivalently, custA (customer A) is similar to custC (customer C) due to similar reasons. One may use a relational view (i.e., a SQL query) of a table, rather than the original table, to generate text representing the database content. The text representation of the table row is shown in 204 with "custD 9/16 Store D NY Stationery 'Crayons, Folders' 25".

This example illustrates a feature of the cognitive database: the neighborhood context used for building the word embedding model is determined by the relational view being used. Hence, the inferred semantic meaning of the relational entities reflects the collective relationships defined within the associated relational view.

The cognitive relational database has been designed as an extension to the underlying relational database, and thus supports all existing relational features. A cognitive relational database supports a new class of business intelligence (BI) queries called Cognitive Intelligence (CI) queries. CI queries take relations as input, use the word embedding vectors to enable novel semantics queries over the relational data, and return a relation as output. CI queries augment the capabilities of the traditional relational BI queries by providing contextual semantics-based insights and can be used in conjunction with existing SQL operators.

The system trains a word embedding model using data from a relational database. The training approach is characterized by two unique aspects: (1) Using unstructured text representation of the structured relational data as input to the training process, and (2) Using the unsupervised word embedding technique to generate meaning vectors from the input text corpus.

Figure 3:
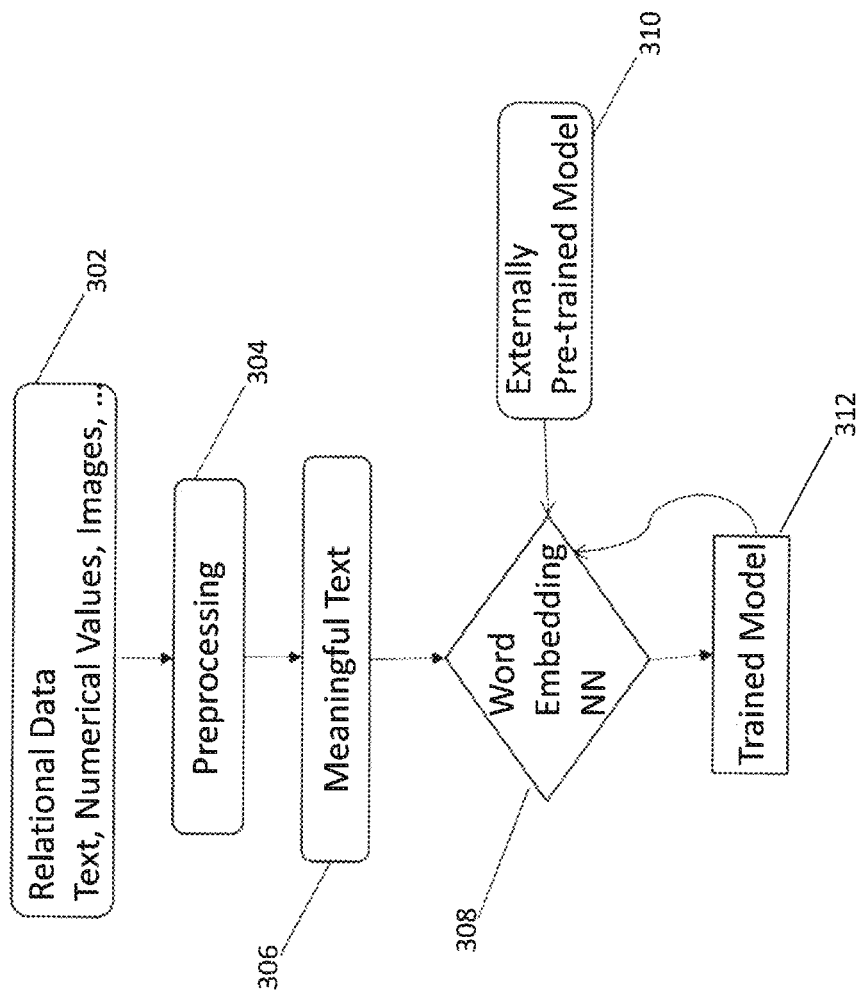
FIG. 3 illustrates the multiple stages in creating the word embedding model of an exemplary embodiment.

With reference to FIG. 3 (and also FIG. 1), The data is prepared as follows. The data preparation stage takes a relational table with different SQL types as input and returns an unstructured but meaningful text corpus consisting of a set of sentences 302. This transformation allows us to generate a uniform semantic representation of different SQL types. This process of textification requires two stages: data pre-processing 304 and text conversion (FIG. 3).

The textification phase processes each relational row separately and for each row, converts data of different SQL data types to text. In some scenarios, one may want to build a model that also captures relational column names. For such cases, the pre-processing stage 304 first processes the column names before processing the corresponding data.

In addition to text tokens, the implementation supports numeric values and images (one assumes that the database being queried contains a VARCHAR column storing links to the images). These techniques can be applied to other SQL datatypes such as SQL Date as well. For numeric values, the system three different approaches to generate equivalent text representations:

(1) creating a string version of the numerical value, e.g., value 100.0 for the column name price can be represented by either PRICE 100.0 or "100.0",
(2) User-managed categorization: a user can specify rules to define ranges for the numeric values and use them to generate string tokens for the numeric values. For example, consider values for a column name, Cocoa Contents. The value 80%, can be replaced by the string token choc_dark, while the value 35%, can be replaced by the string token choc_med, etc., and
(3) user-directed clustering: a user can choose values of one or more numerical columns and cluster them using traditional clustering algorithms such as K-Means. Each numeric value is then replaced by a string representing the cluster in which that value lies (e.g., cluster 10 for value 25 in FIG. 2).

For image data, approaches similar to ones used for numerical values can be used. The first approach represents an image by its string token, e.g., a string representing the image path or a unique identifier. The second approach uses pre-existing classifiers to cluster images into groups and then uses the cluster information as the string representation of the image. For example, one can use a domain-specific deep neural network (DNN) based classifier to cluster input images into classes and then use the corresponding class information to create the string identifiers for the images. The final approach applies of-the-shelf image to tag generators, e.g., IBM Watson Visual Recognition System (VRS), to extract image features and uses them as string identifiers for an image. For example, a Lion image can be represented by the following string features, Animal, Mammal, Carnivore, BigCat, Yellow, etc.

Once text, numeric values and images are replaced by their text representations, a relational table can be viewed as an unstructured meaningful text corpus 306 to be used for building a word embedding model 308. For Null values of these types, the system replaces them by the string column_name_Null. The methods outlined here can be applied to other data types such as SQL Date and spatial data types such as latitude and longitude.

Training the model is further clarified as follows. The system can use an unsupervised neural network approach, based on the Word2Vec (W2V) implementation, to build the word embedding model from the relational database data. The present training approach operates on the unstructured text corpus, organized as a collection of English-like sentences, separated by stop words (e.g., newline). A text token in a training set can represent either text, numeric, or image data. Thus, the model builds a joint latent representation that integrates information across different modalities using untyped uniform feature (or meaning) vectors.

Some of key differences from previous approaches are as follows. A sentence generated from a relational row is generally not in any controlled natural language such as English.1 Therefore, W2V's assumption that the influence of any word on a nearby word decreases as the word distances increases, is not applicable. In the present implementation, every token in the training set has the same influence on the nearby tokens; i.e., we view the generated sentence as a bag of words, rather than an ordered sequence.

Another consequence is that unlike an English sentence, the last word is equally related to the first word as to its other neighbors. To enable such relationships, we use a circular neighborhood window that wraps around a sentence (i.e., for the last word, the first word can be viewed as its immediate neighbor).

After training, meaning of an English token, e.g., Banana, no longer corresponds to its original English meaning, but represents semantic contributions of tokens from the sentences corresponding to the relational rows.

For relational data, the system provides special consideration to primary keys, which are unique. First, the classical W2V discards less frequent words from computations. In the present implementation, every token, irrespective of its frequency, is assigned a vector. Second, irrespective of the distance, a primary key is considered a neighbor of every other word in a sentence and included in the neighborhood window for each word. Also, the neighborhood extends via foreign key occurrences of a key value to the row in which that value is key.

Finally, the present implementation is designed to enable incremental training, i.e., the training system takes as input a pre-trained model and a new set of generated sentences, and returns an updated model. This capability is critical as a database can be updated regularly and one cannot rebuild the model from scratch every time. The pre-trained model 310 can be built from the database being queried, or from an external source. Such sources may be publicly available general sources (e.g., WIKIPEDIA), text from a specific domain (e.g., from the FDA regarding medical drugs), text textified from other databases or text formed from a different subset of tables of the same database. The use of pre-trained models 310 is an example of transfer learning, where a model trained on an external knowledge base can be used either for querying purposes or as a basis of a new model. The trained model 312 is thus generated.

In practice, enterprise database systems, as well as data warehouses, are built using many inter-related database tables. The training approach outlined here can be extended to enable training over multiple tables.

Figure 4:
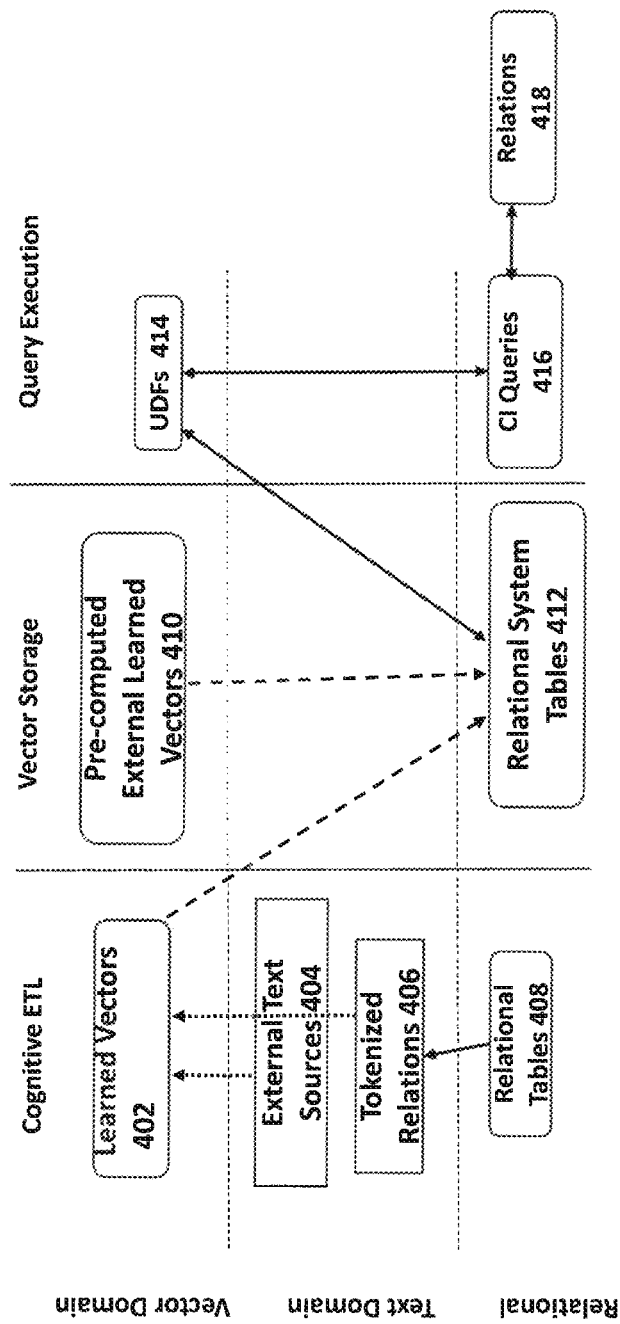
FIG. 4 illustrates the cognitive database stages of the exemplary embodiment.

The cognitive database system is built as follows. FIG. 4 illustrates the cognitive database stages of the exemplary embodiment. Referring to FIG. 4, Cognitive intelligence (CI) queries 416 are standard SQL queries and can be implemented using the existing SQL query execution infrastructure. The distinguishing aspect of cognitive intelligence queries, contextual semantic comparison between relational variables, is implemented using user-defined functions (UDFs) 414. These UDFs, termed cognitive UDFs, take typed relational values as input and compute semantic relationships between them using uniformly untyped meaning vectors. This enables the relational database system to seamlessly analyze data of different types (e.g., text, numeric values, and images) using the same SQL CI query.

A cognitive UDF 414 takes as input either relational query variables or constant tokens, and returns a numeric similarity value that measures the semantic relationships between the input parameters. The UDFs 414 perform three key tasks: (1) processing input relational variables to re-create tokens used for training. This involves potentially repeating the steps executed during the data preparation stage, such as creating compound tokens. For numeric values, one can use the centroid information to identify the corresponding clusters. For images, the UDF uses the image name to obtain corresponding text tokens, (2) Once the training tokens are extracted, the UDF uses them to fetch corresponding meaning vectors from the pre-trained model, and (3) Finally, the UDF uses the fetched vectors to execute similarity computations to generate the final semantic relationship score.

The basic cognitive UDF operates on a pair of sets (or sequences) of tokens associated with the input relational parameters (note: value of a relational parameter can be a set, e.g., {Bananas, Apples}, see FIG. 1). The core computational operation of a cognitive UDF is to calculate similarity between a pair of tokens by computing the cosine distance between the corresponding vectors.

The cognitive intelligence queries are further described as follows. The basic UDF and its extensions are invoked by the SQL CI queries to enable semantic operations on relational variables. Each CI query 416 uses the UDFs 414 to execute nearest neighbor computations using the vectors 402 from the current word-embedding model. Thus, CI queries 416 provide approximate answers that reflect a given model.

Referring to FIG. 4, the relational tables 408 is output to tokenized relations 406. The learned vectors 402 are generated from the external text sources 404 and the tokenized relations 406. The learned vectors 402 is sent to the relational system tables. Additionally, the pre-computed external learned vectors 410 are also sent to the relational system tables 412. The UDF uses and updates the relational system tables 412.

The CI queries 416 can be broadly classified into four categories as follows: (1) Similarity/Dissimilarity Queries, (2) Inductive Reasoning Queries, (3) Cognitive OLAP Queries; and (4) Cognitive Extensions to the Relational Data-Model.

In Similarity/Dissimilarity Queries, the basic UDF that compares two sets of relational variables can be integrated into an existing SQL query to form a similarity CI query. For example, a CI query can be:

val result_df=spark.sql(s"""
SELECT VENDOR_NAME,
proximityCust_NameUDF(VENDOR_NAME, '$v')
AS proximityValue FROM Index_view
HAVING proximityValue>0.5
ORDER BY proximityValue DESC
""")

In the CI similarity Query, the system finds similar entities to a given entity (VENDOR_NAME) based on transaction characteristic similarities.

The query can use a UDF, similarityUDF( ), that computes similarity score between two sets of vectors, that correspond to the items purchased by the corresponding customers. The purchased item list can be viewed as an unordered bag of items; and individual pairwise distances contribute equally to the final result. The query shown in FIG. 4 uses the similarity score to select rows with identify similar customers based on their overall purchasing pattern as evidenced in a number of rows. The word embedding model creates a vector for each customer name that captures the overall purchases made by that customer.

Then, the customers with similar purchase patterns would have vectors that are close using the cosine distance metric. This query can be customized to restrict the purchases to a particular time period, e.g., a specific quarter or a month. The query would use vector additions over vectors to compute new vectors (e.g., create a vector for purchasing patterns of a customer custA in quarter Q3 by adding vectors for custA and quarter_Q3), and use the modified vectors to find the target customers. The patterns observed in these queries can be applied to other domains as well, e.g., identifying patients that are taking similar drugs, but with different brand names, or identifying food items with similar ingredients, or recommending mutual funds with similar investment strategies. The similarity query can be applied to other data types, such as images.

Solutions to inductive reasoning queries exploit latent semantic structure in the trained model via algebraic operations on the corresponding vectors. On can encapsulate these operations in UDFs to support following five types of inductive reasoning queries: analogies, semantic clustering, and analogy sequences, clustered analogies, and oddman-out.

In Inductive Reasoning Queries, a unique feature of word embedding vectors is their capability to answer inductive reasoning queries that enable an individual to reason from part to whole, or from particular to general.

A common way of expressing an analogy is to use relationship between a pair of entities, source_1 and target_1, to reason about a possible target entity, target_2, associated with another known source entity, source_2. An example of an analogy query is Lawyer:Client::Doctor:?, whose answer is Patient. To solve an analogy problem of the form X:Y::Q:?, one needs to find a token W whose meaning vector, $V_W$, is closest to the ideal response vector $V_R$, where $V_R = V_Q + V_Y - V_X$.

Cognitive OLAP Queries can include a simple example of using semantic similarities in the context of a traditional SQL aggregation query. This CI query aims to extract the maximum sale amount for each product category in the sales table for each merchant that is similar to a specified merchant, Merchant_Y. The result is collated using the values of the product category. As illustrated earlier, the UDF similarity UDF can also be used for identifying customers that are different than the specified merchant. The UDF can use either an externally trained or locally trained model. This query can be easily adapted to support other SQL aggregation functions such as MAX( ), MIN( ), and AVG( ). This query can be further extended to support ROLLUP operations over the aggregated values.

Figure 12:
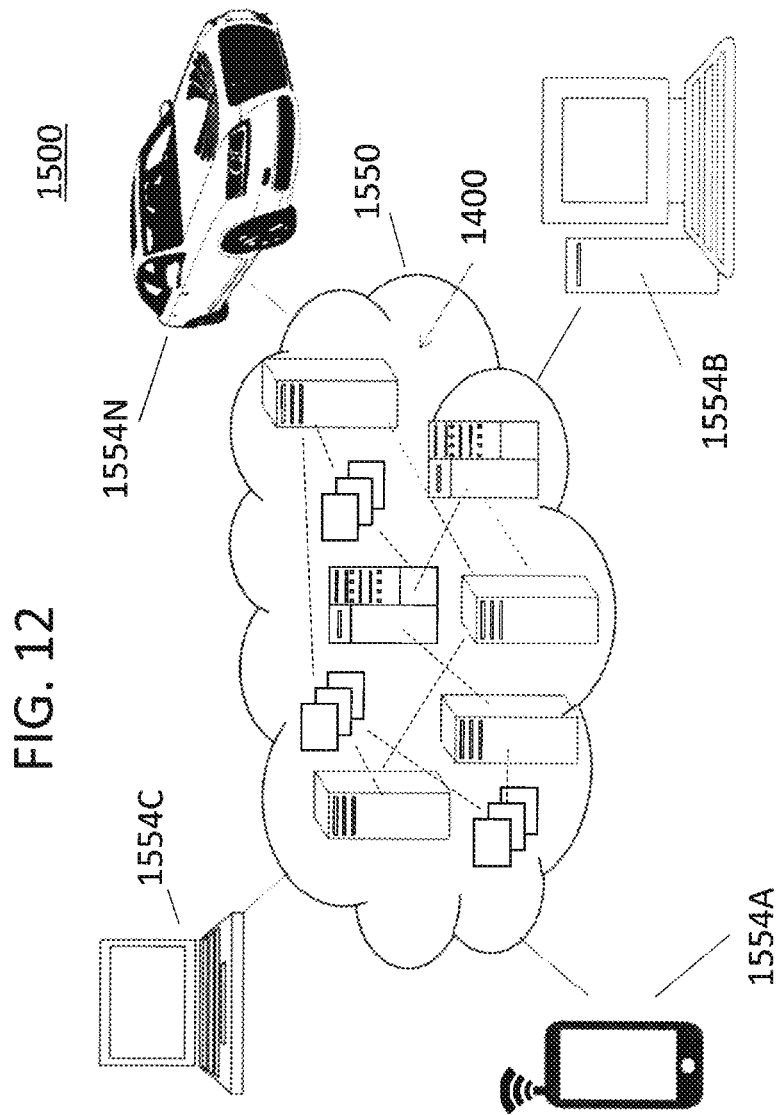
FIG. 12 depicts a cloud computing environment according to an embodiment of the present invention.

Cognitive Extensions to the Relational Data Model is as follows. There are powerful extensions to SQL that are enabled by word vectors. For this one needs the ability to refer to constituent tokens (extracted during textification) in columns of rows, in whole rows and in whole relations. The extension is via a declaration, in the FROM clause, of the form Token el that states that variable el refers to a token. To locate a token we use, in the WHERE clause, predicates of the form contains (E, el) where E can be a column in a row (e.g., EMP.Address), a whole row (e.g., EMP.*) or a whole relation (e.g., EMP). With this extension we can easily express queries such as asking for an employee whose Address contains a token which is very close to a token in a row in the DEPT relation (FIG. 12). Furthermore, we can also extend SQL with relational variables, say of the form $R and column variables, say X, whose names are not specified at query writing time; they are bound at runtime. We can then use these variables in queries, in conjunction with Token variables. This enables data-base querying without explicit schema knowledge which is useful for exploring a database. Interestingly, the notation $R.X is basically syntactic sugar. A software translation tool can substitute for $R.X an actual table name and an actual column. Then, perform the query for each such substitution and return the union of the results.

Cognitive database applications include analysis over multi-modal data (Retail, Health, Insurance). entity similarity queries (Customer Analytics, IT Ticket Management, Time-series), cognitive OLAP (Finance, Insurance . . . ), entity Resolution (Master Data Management), and analysis of time-series data (IoT, Health).

Cognitive queries in practice are as follows. The following illustrates some unique capabilities of the present cognitive database system by discussing a scenario in which CI queries are used to gain novel insights from a multi-modal relational data base. In this scenario, one considers a database of national parks across multiple countries, with links to images of animals in the associated national parks. The system uses images from the open source Image database, ImageNet, to populate our database. The system can use this database to present results from inductive reasoning CI queries.

Although the database under evaluation is fairly simple, its architecture is similar to many other real-life databases, e.g., a multi-modal patient database with text fields describing patient characteristics and image fields referring to associated images (e.g., radiology or FMRI images), or an insurance claims database with text fields containing the claim information and image fields storing supporting pictures (e.g., car collision photos).

Figure 5:
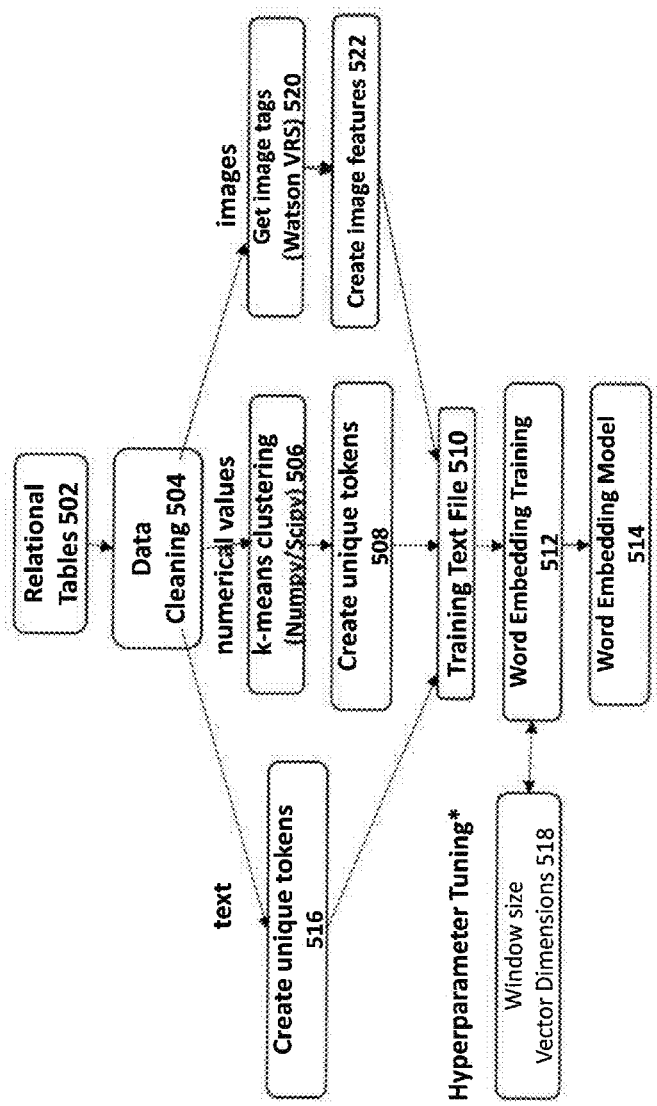
FIG. 5 illustrates training from source database in an exemplary embodiment.

FIG. 5 illustrates training from source database in an exemplary embodiment. Relational tables 502 are then inputted for data cleaning 504, which then is sent as text to create unique tokens 516, the numerical values can use k-means clustering 406, while images can get image tags 520. Cluster the vectors of these relevant tokens into k clusters, say using k-means. The clustering can include creating a two columns table TT recording in column ClusterNum the cluster number of each relevant token's vector. The tokens are in column Token. From the clustering at 506, there is then created unique tokens 508.

The training text file 510 is performed from the unique tokens for the text 516, the tokens for the numerical values and image features 522 generated from the images. The training text file 510 is then inputted for word embedding training 512. The word embedding training 512 can be tuned for windows size with vector dimensions 518. The word embedding training 512 then generates the word embedding model 514.

Figure 6:
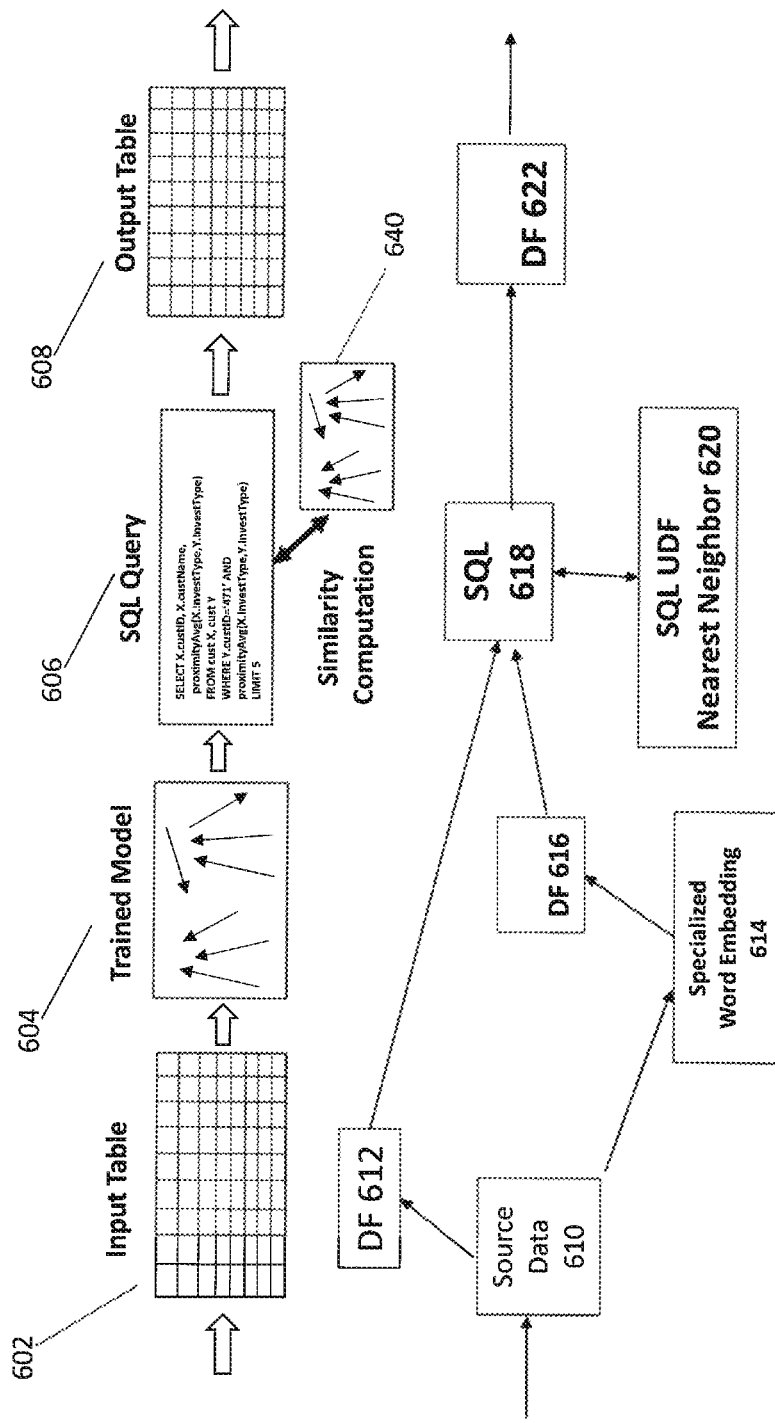
FIG. 6 illustrates a cognitive database with an example execution flow in an exemplary embodiment.

FIG. 6 illustrates a cognitive database with an example execution flow in an exemplary embodiment. For example, FIG. 6 can be a SPARK execution flow, or any other mode of distributing computations over a cluster of machines using a distributed infrastructure. The input table 602 can include the source data 610 to output to dataframe 612 and specialized word embedding 614 during the trained model phase 604. The specialized word embedding 614 outputs dataframe 616, which is then input to SQL 618 for SQL Query phase 606. Similarity computation 640 can be made as a SQL UDF nearest neighbour 620. The SQL 618 query then outputs to the output table as a dataframe 622.

Figure 7:
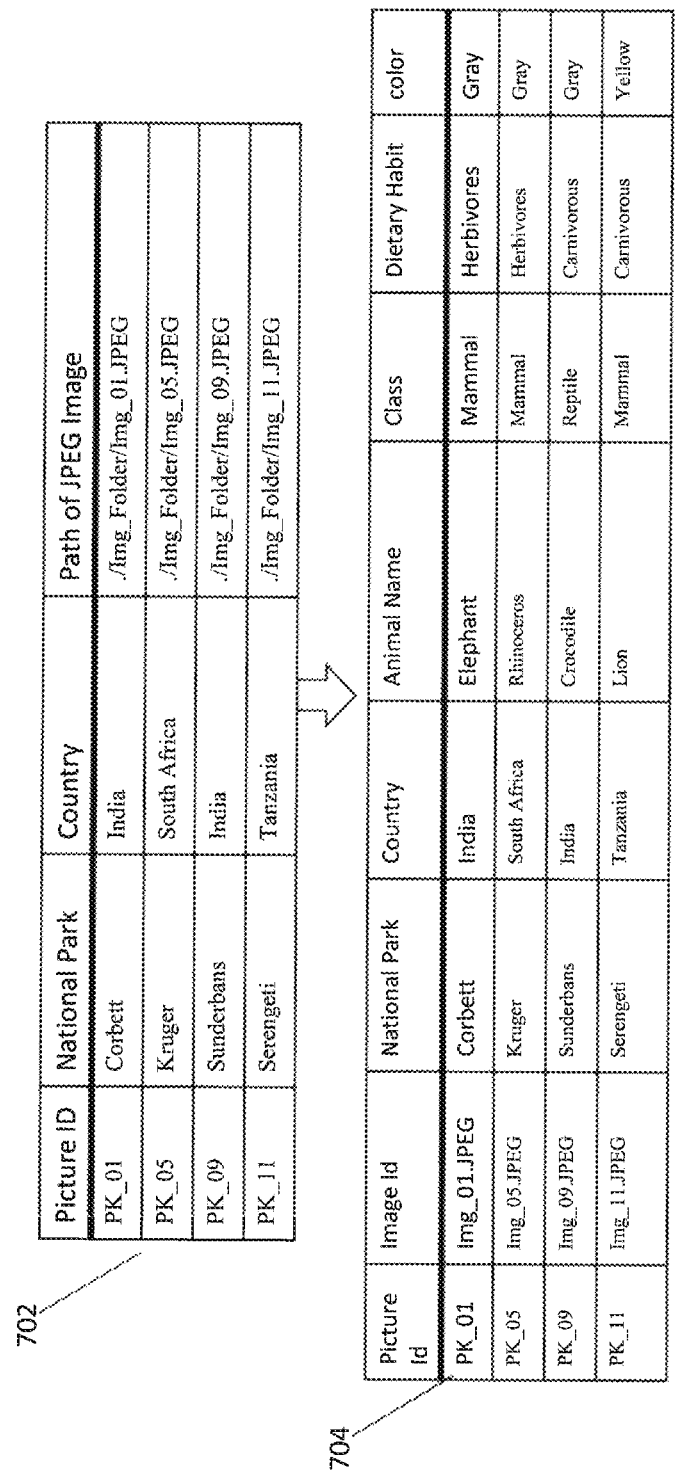
FIG. 7 illustrates an application database with links to images in an exemplary embodiment.

FIG. 7 illustrates an application database with links to images in an exemplary embodiment. The database 702 shows the picture IDs with the links to the pictures. The Internal Training database is then shown with features extracted from linked images in 704 such as the color, dietary habit, class, etc. The merged data 704 is used as an input to train the word embedding model that generates embeddings of each unique token based on the neighborhood. Each row of the database is viewed as a sentence.

Figure 8:
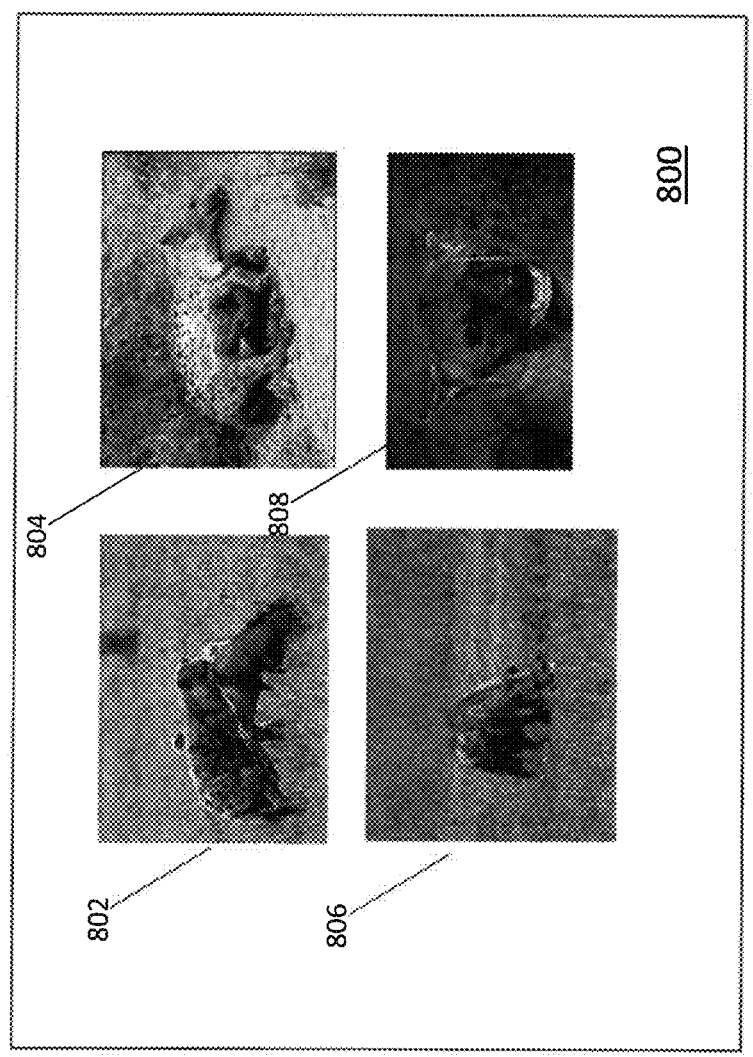
FIG. 8 illustrates an example application in an exemplary embodiment.

FIG. 8 illustrates an example application in an exemplary embodiment. CI Query using external knowledge base: Find all images of animals whose classD similarity score to the Concept of "Hypercarnivore" of WIKIPEDIA using proximityAvgForExtKB UDF is greater than 0.5. Exclude images that are already tagged as carnivore, herbivore, omnivore or scavenger.

SELECT X.imagename,X.classA,X.classB,X.classC, X.classD
FROM ImageDataTable X
WHERE
(proximityAvgAdvForExtKB('CONCEPT_Hypercarnivore',
X.classD)>0.5)
ORDER BY SimScore DESC The Example in FIG. 8 demonstrates the use of an external semantic model for querying a multi-modal database. In this scenario, the system first trains a word embedding model from an external knowledge base derived from an internet definition (e.g., WIKIPEDIA, etc.). Similar to the model trained from the database, the external model assigns d dimensional meaning vectors to unique tokens (for the external model, we use d=200). From the definition model, we select a token associated with a concept Hypercarnivore, which refers to a class of animals whose diet has more than 70% meat. Examples of hyper-carnivores include lions, sharks, polar bears, crocodiles, hyenas, etc. Therefore, in our model, the Hypercarnivore meaning vector is related to meaning vectors of tokens shark, crocodiles, etc. For this query, the system employs this externally trained model to extract images that are similar to the concept Hypercarnivore. The UDF proximityAvgForExtKB( ) uses the external model, finds images from the database whose classD features (i.e., names) are related to Hypercarnivore, and returns those images whose similarity score is higher than 0.5. FIG. 8 shows the CI query and its result: pictures of hyenas 802-808 in display 800, who are members of the hypercarnivore class3. This example also demonstrates the unique capability of cognitive databases that allows querying a database using a token not present in the database. In this case, both the original and training databases do not contain the token Hypercarnivore.

FIG. 8 is only an example, as CI queries are applicable to a broad class of domains. These include finance, insurance, retail, customer care, log analytics, healthcare, genomics, semantic search over documents (patent, legal, or financial), healthcare informatics, and human resource management.

Therefore, it is shown a novel relational database system that uses word embedding approach to enable semantic queries in SQL. Also shown is Spark-based implementation that loads data from a variety of sources and invokes Cognitive Intelligence queries using Spark SQL. There was shown a demonstration of the cognitive database capabilities using a multi-modal (text+image) dataset. In addition, there was an illustration of seamlessly integrating AI capabilities into relational database ecosystem.

Figure 9:
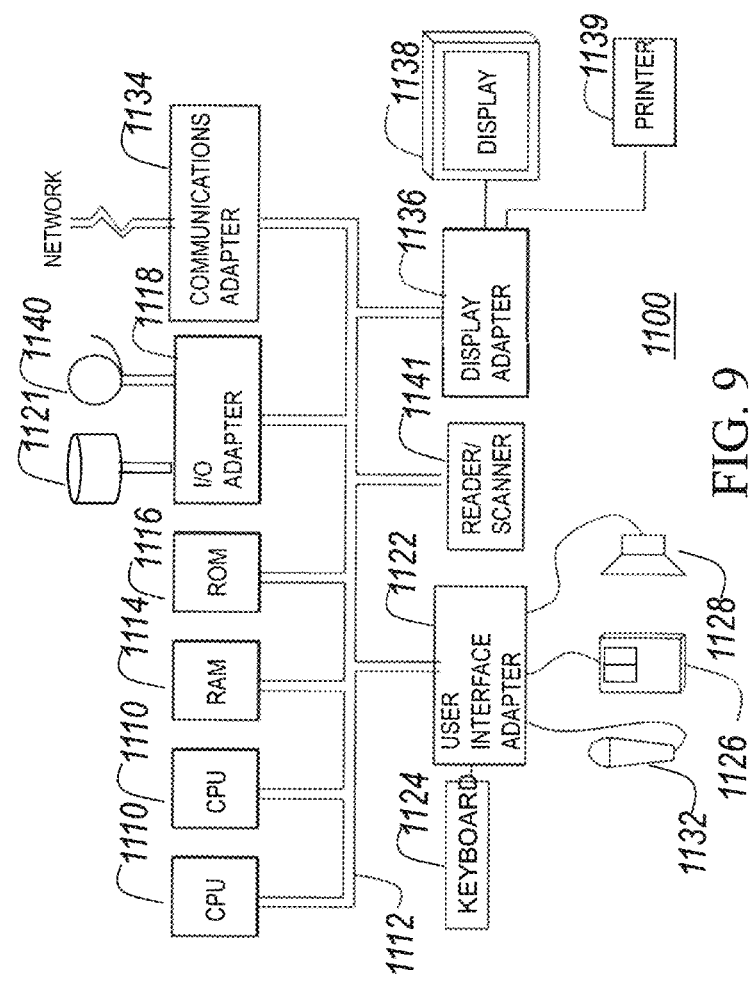
FIG. 9 illustrates an exemplary hardware/information handling system for incorporating the exemplary embodiment of the invention therein.

FIG. 9 illustrates another hardware configuration of an information handling/computer system 1100 in accordance with the present invention and which preferably has at least one processor or central processing unit (CPU) 1110 that can implement the techniques of the invention in a form of a software program.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Figure 10:
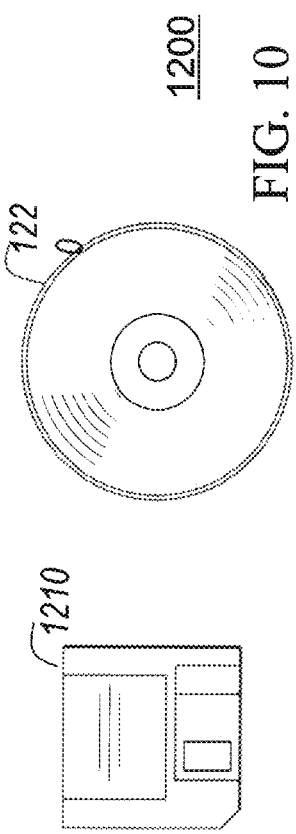
FIG. 10 illustrates a signal-bearing storage medium for storing machine-readable instructions of a program that implements the method according to the exemplary embodiment of the invention.

Alternatively, the instructions may be contained in another signal-bearing storage media 1200, such as a magnetic data storage diskette 1210 or optical storage diskette 1220 (FIG. 10), directly or indirectly accessible by the CPU 1210.

Whether contained in the diskette 1210, the optical disk 1220, the computer/CPU 1210, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
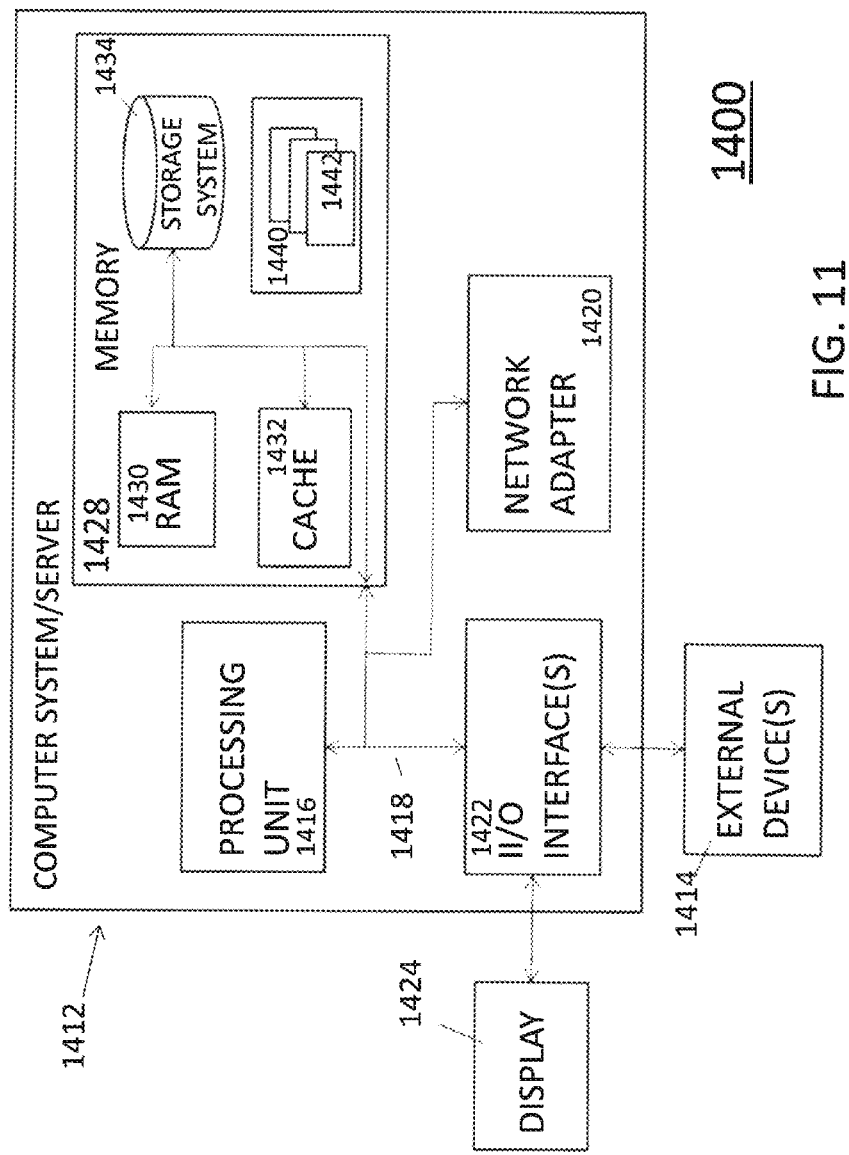
FIG. 11 depicts a cloud computing node according to an embodiment of the present invention.

Referring now to FIG. 11, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove.

In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Referring now to FIG. 12, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 12 are intended to be illustrative only and that computing nodes 1400 and cloud computing environment 1550 can communicate with any type of computerized device over any type of network and/or network addressable connection (e.g., using a web browser).

Referring now to FIG. 13, a set of functional abstraction layers provided by cloud computing environment 1550 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1662 provides an abstraction layer from which the following examples of virtual entities may be provided: virtual servers; virtual storage; virtual networks, including virtual private networks; virtual applications and operating systems; and virtual clients.

In one example, management layer 1664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1666 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method of training with multi-modal data in a relational database, comprising:
   generating a first database including a multi-view of the multi-modal data;
   retrieving a second set of data from an external source; and
   training a first model according the first database and the second set of data;
   wherein the first model outputs relationships of the first database with the multi-view and the second set of data.

2. The method of claim 1, wherein the multi-modal data includes text and image information.

3. The method of claim 1, wherein the training of the first model comprises:
   converting structured data source to unstructured text; and
   processing the unstructured text to build an unsupervised neural network model including word embedding.

4. The method of claim 1, wherein the generating of the first database further comprising generating the multi-view including a dual view of the relational data and identified text.

5. The method of claim 1, further comprising generating vectors to apply word embedding to a string of tokens generated from the first database.

6. The method of claim 1, wherein the generating of the vectors includes learning on text transformed and extracted from the first database or the external source.

7. The method of claim 1, wherein the training the first model includes the word embedding to infer latent semantic information in terms of token associations and co-occurrences and encoding to vectors.

8. A method of cognitive learning, comprising:
   receiving modal types of information as input;
   processing a relational table with the modal types of data as the input to output an unstructured text corpus in a data preparation stage; and
   machine learning a first model from the processing of the relational table and the unstructured text corpus in a training process.

9. The method of cognitive learning of claim 8, wherein the processing the relational table comprises:
   building a second model that also captures relational column names in a pre-processing stage; and
   processing each relational row separately and for each column of the relational table to converts data of different data types to the unstructured text corpus in a textification stage.

10. The method of claim 8, wherein the processing of the relational table with different modal types of information includes text tokens, numeric values and images being replaced with the unstructured text corpus.

11. The method of claim 8, wherein the machine learning of the first model includes generating a uniform semantic representation of the different model types of data.

12. The method of claim 8, wherein the machine learning of the first model includes classifying the different model types of information.

13. The method of claim 8, wherein the machine learning of the first model includes clustering the different model types of information.

14. The method of claim 8, wherein the machine learning of the first model includes representing token the different model types of information as a string token.

15. A method of cognitive learning, comprising:
   receiving relational variables as input;
   processing the relational variables to create tokens used for training; and
   generating similarity values measuring relationships between input parameters of the input.

16. The method according to claim 15, further comprising:
   extracting name of relational variable to obtain corresponding text tokens for training; and
   once the training tokens are extracted, fetching corresponding meaning vectors from a pre-trained model.

17. The method according to claim 16, further comprising:
   generating a word-embedding model from the processing of the relational variables; and
   executing nearest neighbor computations using the vectors from a word-embedding model.

18. The method according to claim 15, wherein the relational variables are formed as a table to output tokenized relations of the input, and
   wherein the generating of similarity values measures semantic relationships between input parameters of the input.

19. The method according to claim 15, further comprising:
   generating learned vectors from the external text sources and the tokenized relations; and
   sending the learned vectors and pre-computed vectors to a table.

20. The method according to claim 15, further comprising executing queries based on the similarity values of the semantic relationships.

* * * * *